United States Patent
Wang et al.

(10) Patent No.: US 9,986,255 B2
(45) Date of Patent: May 29, 2018

(54) METHOD AND DEVICE FOR VIDEO ENCODING OR DECODING BASED ON IMAGE SUPER-RESOLUTION

(71) Applicant: PEKING UNIVERSITY SHENZHEN GRADUATE SCHOOL, Shenzhen (CN)

(72) Inventors: Ronggang Wang, Shenzhen (CN); Yang Zhao, Shenzhen (CN); Zhenyu Wang, Shenzhen (CN); Wen Gao, Shenzhen (CN); Wenmin Wang, Shenzhen (CN); Shengfu Dong, Shenzhen (CN); Tiejun Huang, Shenzhen (CN); Siwei Ma, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 312 days.

(21) Appl. No.: 15/060,627

(22) Filed: Mar. 4, 2016

(65) Prior Publication Data
US 2016/0191940 A1    Jun. 30, 2016

Related U.S. Application Data

(63) Continuation-in-part of application No. PCT/CN2014/078613, filed on May 28, 2014.

(51) Int. Cl.
*H04N 7/12* (2006.01)
*H04N 19/52* (2014.01)
(Continued)

(52) U.S. Cl.
CPC ............. *H04N 19/52* (2014.11); *H04N 19/50* (2014.11); *H04N 19/53* (2014.11);
(Continued)

(58) Field of Classification Search
CPC ........ H04N 19/52; H04N 19/59; H04N 19/85; H04N 19/80; H04N 19/50; H04N 19/543; H04N 19/53
(Continued)

(56) References Cited

U.S. PATENT DOCUMENTS

2009/0304299 A1* 12/2009 Motomura ............ G06T 3/4007
                                                                    382/254
2010/0086048 A1*  4/2010 Ishtiaq ................. H04N 19/105
                                                                    375/240.16

* cited by examiner

*Primary Examiner* — Allen Wong
(74) *Attorney, Agent, or Firm* — Matthias Scholl, PC; Matthias Scholl

(57) ABSTRACT

A method for video encoding based on an image super-resolution, the method including: 1) performing super-resolution interpolation on a video image to be encoded using a pre-trained texture dictionary database to yield a reference image; in which the texture dictionary database includes: one or multiple dictionary bases, and each dictionary basis includes a mapping group formed by a relatively high resolution image block of a training image and a relatively low resolution image block corresponding to the relatively high resolution image block; 2) performing motion estimation and motion compensation of image blocks of the video image on the reference image to acquire prediction blocks corresponding to the image blocks of the video image; 3) performing subtraction between the image blocks of the video image and the corresponding prediction blocks to yield prediction residual blocks, respectively; and 4) encoding the prediction residual blocks.

10 Claims, 5 Drawing Sheets

(51) Int. Cl.
*H04N 19/53* (2014.01)
*H04N 19/543* (2014.01)
*H04N 19/50* (2014.01)
*H04N 19/80* (2014.01)
*H04N 19/85* (2014.01)
*H04N 19/59* (2014.01)

(52) U.S. Cl.
CPC ........... *H04N 19/543* (2014.11); *H04N 19/59* (2014.11); *H04N 19/80* (2014.11); *H04N 19/85* (2014.11)

(58) Field of Classification Search
USPC .................................................... 375/240.16
See application file for complete search history.

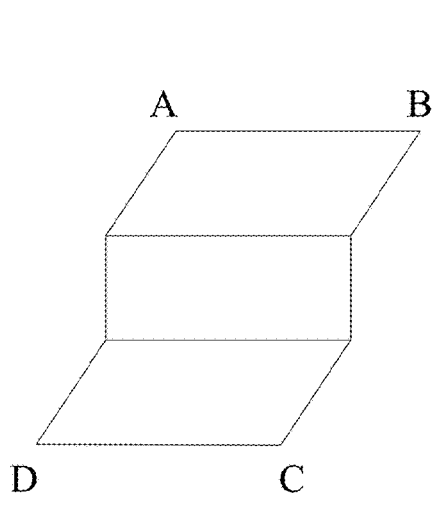
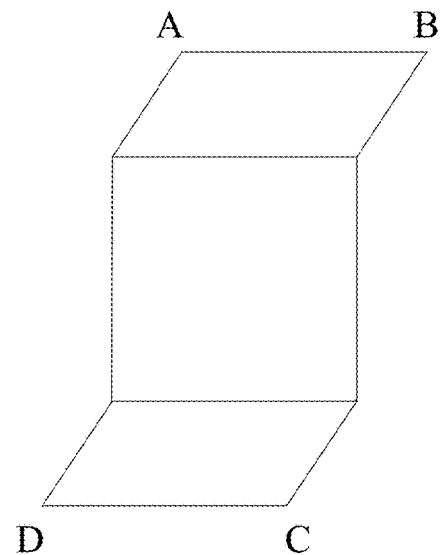
FIG. 2B    FIG. 2C
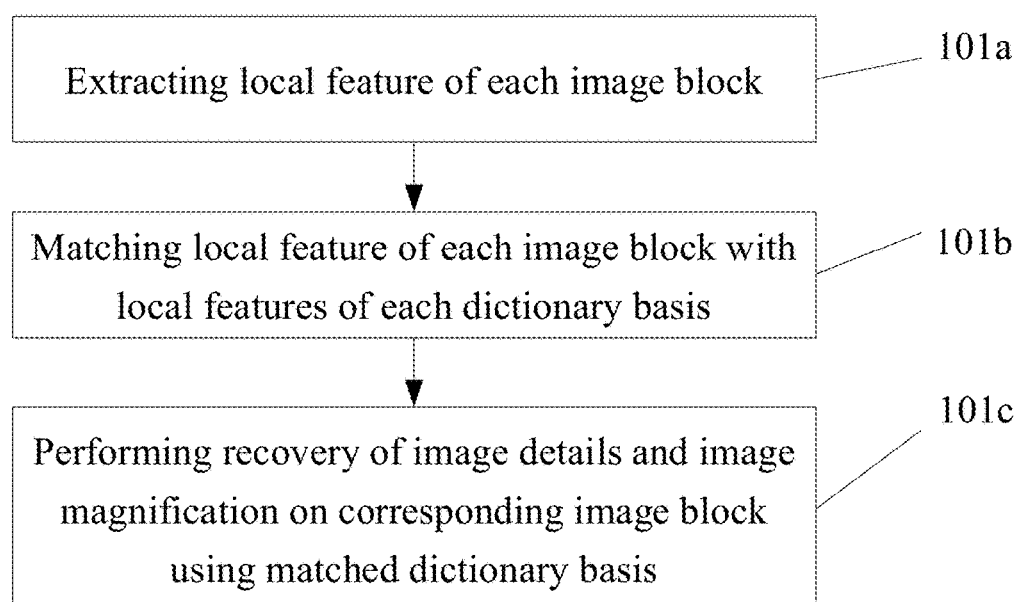
FIG. 3

METHOD AND DEVICE FOR VIDEO ENCODING OR DECODING BASED ON IMAGE SUPER-RESOLUTION

CROSS-REFERENCE TO RELATED APPLICATIONS

This application is a continuation-in-part of International Patent Application No. PCT/CN2014/078613 with an international filing date of May 28, 2014, designating the United States, now pending. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a method and device for video encoding or decoding based on an image super-resolution.

Description of the Related Art

Typically, the motion compensation of fractional-pixels is adopted to improve the predictive efficiency among video image frames, and the information of the fractional-pixels is collected through the linear interpolation method. However, it is difficult for the linear interpolation method to recover the high frequency details of the high resolution image, and the edge of the image tends to blur, all of which restrict the efficiency of the motion compensation of the fractional-pixels.

SUMMARY OF THE INVENTION

In view of the above-described problems, it is one objective of the invention to provide a method and device for video encoding or decoding based on an image super-resolution. The device and the method of the invention are able to recover the high-frequency information of the image and improve the image quality, and are therefore applicable for spatio-temporal prediction to improve the prediction accuracy and the encoding/decoding efficiency.

To achieve the above objective, in accordance with one embodiment of the invention, there is provided a method for video encoding based on an image super-resolution. The method comprises:

1) performing super-resolution interpolation on a video image to be encoded using a pre-trained texture dictionary database to yield a reference image; in which the texture dictionary database comprises one or multiple dictionary bases; each dictionary basis comprises a mapping group formed by a relatively high resolution image block of a training image and a relatively low resolution image block corresponding to the relatively high resolution image block; and the super-resolution interpolation comprises: image magnification and recovery of image details;

2) performing motion estimation and motion compensation of image blocks of the video image on the reference image to acquire prediction blocks corresponding to the image blocks of the video image;

3) performing subtraction between the image blocks of the video image and the corresponding prediction blocks to yield prediction residual blocks, respectively; and 4) encoding the prediction residual blocks.

In accordance with another embodiment of the invention, there is provided a method for video decoding based on an image super-resolution. The method comprises:

1) decoding an acquired encoded bit stream of an image to yield prediction residual blocks;

2) performing super-resolution interpolation on a video image to be decoded using a pre-trained texture dictionary database to yield a reference image; in which the texture dictionary database comprises one or multiple dictionary bases; each dictionary basis comprises a mapping group formed by a relatively high resolution image block of a training image and a relatively low resolution image block corresponding to the relatively high resolution image block; and the super-resolution interpolation comprises: image magnification and recovery of image details;

3) performing motion compensation of image blocks of the video image to be decoded on the reference image to acquire prediction blocks corresponding to the image blocks; and 4) adding the prediction blocks to the corresponding prediction residual blocks to acquire a video image after being decoded.

In accordance with still another embodiment of the invention, there is provided a device for video encoding based on an image super-resolution. The device comprises:

1) a super-resolution interpolation unit configured to perform super-resolution interpolation on a video image to be encoded using a pre-trained texture dictionary database to yield a reference image; in which the texture dictionary database comprise one or multiple dictionary bases; each dictionary basis comprises a mapping group formed by a relatively high resolution image block of a training image and a relatively low resolution image block corresponding to the relatively high resolution image block; and the super-resolution interpolation comprises: image magnification and recovery of image details;

2) a prediction unit configured to perform motion estimation and motion compensation of image blocks of the video image on the reference image to acquire prediction blocks corresponding to the image blocks of the video image;

3) a subtraction calculation unit configured to perform subtraction between the image blocks of the video image and the corresponding prediction blocks acquired by estimation of a motion estimation unit to yield prediction residual blocks, respectively; and 4) an encoding unit configured to encode the prediction residual blocks acquired by calculation of the subtraction calculation unit.

In accordance with still another embodiment of the invention, there is provided a device for video decoding based on an image super-resolution. The device comprises:

1) a decoding unit configured to decode an acquired encoded bit stream of an image to yield prediction residual blocks;

2) a super-resolution interpolation unit configured to perform super-resolution interpolation on a video image to be decoded using a pre-trained texture dictionary database to yield a reference image; in which the texture dictionary database comprises one or multiple dictionary bases; each dictionary basis comprises a mapping group formed by a relatively high resolution image block of a training image and a relatively low resolution image block corresponding to the relatively high resolution image block; and the super-resolution interpolation comprises: image magnification and recovery of image details;

3) a prediction unit configured to perform motion compensation of image blocks of the video image to be decoded on the reference image to acquire prediction blocks corresponding to the image blocks of the video image to be decoded; and 4) an addition calculation unit configured to add the prediction blocks acquired by a motion compensation unit to the corresponding prediction residual blocks acquired by the decoding unit to acquire a video image after being decoded.

Advantages of the methods and the devices for video encoding or decoding based on the image super-resolution according to embodiments of the invention are summarized as follows: the encoding/decoding method of the invention first processes the video image/decoded with the super-resolution interpolation before the prediction, in which the image to be encoded/decoded can be magnified and the detail information thereof can be recovered. Thus, in the prediction of the image to be encoded/decoded for yielding the prediction blocks, the methods of the invention are more effective in restoration of the original image compared with the existing methods for predicting the video image by the linear interpolation, so that the edge blur problem occurring in the prediction blocks in the prior art is avoided, and the prediction accuracy and the encoding/decoding efficiency are improved.

BRIEF DESCRIPTION OF THE DRAWINGS

The invention is described hereinbelow with reference to the accompanying drawings, in which:

FIGS. 2A-2C are structure diagrams of feature extraction of a local texture structure of an image block in accordance with one embodiment of the invention;

FIG. 3 is a flow chart of super-resolution interpolation on a video image to be encoded using a pre-trained texture dictionary database of Example 2;

DETAILED DESCRIPTION OF THE EMBODIMENTS

For further illustrating the invention, experiments detailing methods and devices for video encoding or decoding based on an image super-resolution are described below. It should be noted that the following examples are intended to describe and not to limit the invention.

The devices and the methods of the invention are able to recover the high-frequency information of the image and improve the image quality, and are therefore applicable for spatio-temporal prediction to improve the prediction accuracy and the encoding/decoding efficiency.

EXAMPLE 1

Figure 1:
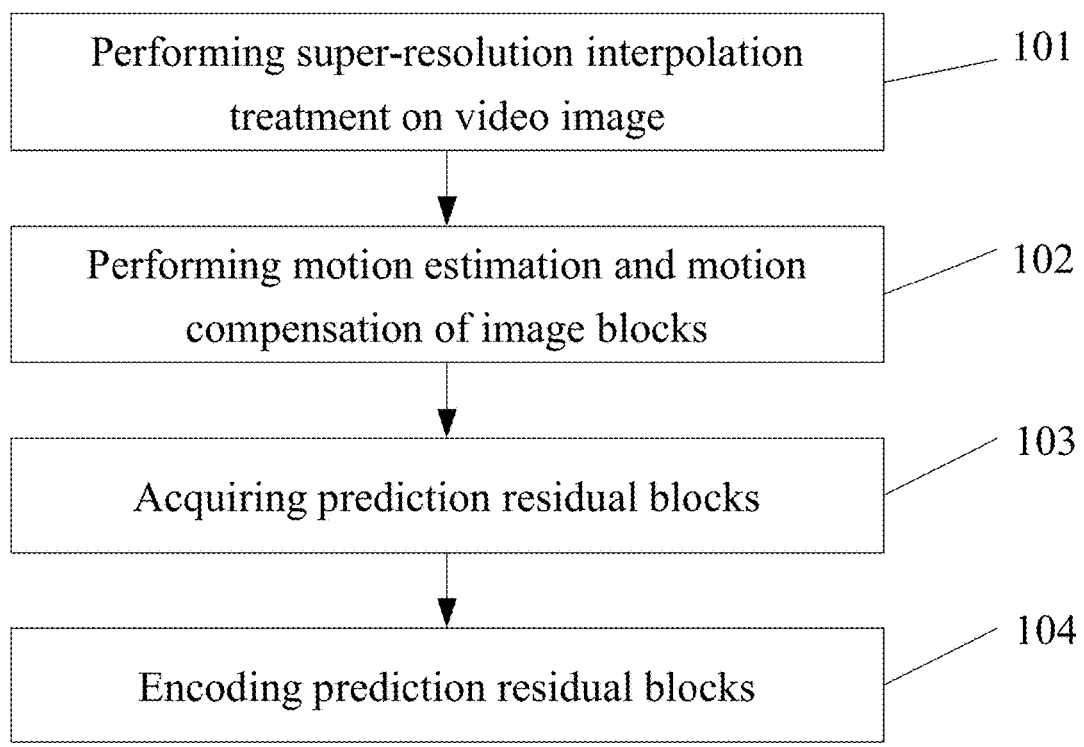
FIG. 1 is a flow chart of a method for video encoding based on an image super-resolution of Example 1.

FIG. 1 is a flow chart illustrating a method for video encoding based on an image super resolution. As shown in FIG. 1, the method for video encoding based on the image super-resolution comprises:

101. Performing super-resolution interpolation on a video image to be encoded using a pre-trained texture dictionary database. After the super-resolution interpolation treatment, a reference image is yielded. The texture dictionary database comprises one or multiple dictionary bases. Each dictionary basis comprises a mapping group formed by a relatively high resolution image block of a training image and a relatively low resolution image block corresponding to the relatively high resolution image block. The super-resolution interpolation comprises: image magnification and recovery of image details.

102: Performing motion estimation and motion compensation of image blocks of the video image on the reference image to acquire prediction blocks corresponding to the image blocks;

The image blocks can be divided on the video image according to a preset division rule, for example, each image block is divided into 2×2 pixels. Herein, the division rule is not limited to this example.

In the above method, each image block of the video image can be performed with the motion estimation and the motion compensation in the reference image so as to calculate a position displacement and a corresponding pixel value of each image block in the reference image, so that the prediction block corresponding to each image block of the video image after the motion estimation is acquired.

103. Performing subtraction between the image blocks of the video image and the corresponding prediction blocks to yield prediction residual blocks, respectively; and 104. Encoding the prediction residual blocks.

In the video encoding method based on the image super-resolution provided in this example, the pre-trained texture dictionary database is employed to carry out the super-resolution interpolation on the video image, which comprises the image magnification and the recovery of the image detail, motion estimation is conducted on the reference mage after being processed with the super-resolution interpolation to yield corresponding prediction blocks, then subtractions are performed between the images blocks of the video image and the corresponding prediction blocks to acquire the prediction residual blocks, respectively, and the prediction residual blocks are finally encoded. Compared with the method for predicting the video image by the linear interpolation in the prior art, the encoding method of the invention firstly processes the video image with the super-resolution interpolation before the prediction, during which the image to be encoded can be magnified and the detail information thereof can be recovered. Thus, in the subsequent motion estimation of the image to be encoded for yielding the prediction blocks, the edge blur problem occurring in the prediction blocks in the prior art is avoided, thereby improving the prediction accuracy and the encoding efficiency.

Preferably, the dictionary bases in the texture dictionary database are classified according to local features of the relatively high resolution image blocks of each training image and local features of the relatively low resolution image blocks corresponding to the relatively high resolution image blocks. Each local feature comprises a local binary structure (LBS) and a sharp edge structure (SES).

In this example, the texture dictionary is obtained by pre-training as follows:

S1. Selecting multiple high resolution local image blocks from a training image set comprising a plurality of training images, in which, each of the high resolution local image blocks is formed by at least two pixels of the image. The training image is then treated with down sampling so as to acquire low resolution local image blocks corresponding to the high resolution local image blocks, respectively.

S2. Extracting the local features of the high resolution local image blocks to yield high resolution dictionary samples Dh(y), and extracting the local features of the low resolution local image blocks corresponding to the high resolution dictionary local image blocks, respectively, to yield low resolution dictionary samples Dl(y), and mapping each of the high resolution dictionary samples Dh(y) onto the corresponding low resolution dictionary sample Dl(y) to form each group of dictionary basis sample, in which the local feature comprises the LBS and the SES.

S3. Training multiple groups of the dictionary bases samples to acquire the texture dictionary database.

Hereinbelow, the process and the principle of the super-resolution interpolation on the video image using the pre-trained texture dictionary database are illustrated by examples.

Figure 2A:
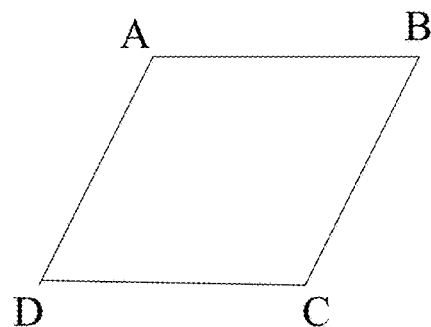

As shown in FIGS. 2A, 2B, and 2C, A, B, C, and D represent four locally adjacent pixels, and a height of each pixel reflects a gray value thereof. In FIG. 2A, the four pixels A, B, C, and D form a flat local region and have the same gray value. In FIG. 2B, the gray values of the pixels A and B are higher than the gray value of the pixels C and D. Herein LBS-Geometry (LBS_G) is defined in order to clarify the difference in the geometry structures, equation for calculating LBS-Geometry (LBS_G) is as follows:

$$LBS\_G = \sum_{P=1}^{4} S(g_p - g_{mean})2^{p-1}, S(x) = \begin{cases} 1, x \geq 0 \\ 0, \text{else} \end{cases} \quad (1)$$

in which, $g_p$ represents the gray value of a pth pixel in a local region, and $g_{mean}$ represents a mean value of gray values of the local four pixels A, B, C, and D. In this example, the four pixels A, B, C, and D are taken as an example, while in other examples, the number of the pixels can be others, such as N, which represents a positive integer.

Because the local image blocks, as shown in FIGS. 2B and 2C, have different degrees of the gray difference, the local image blocks still belong to different local modes. Thus, LBS-Difference (LBS_D) is defined in this example in order to represent the degree of local gray difference, and the following equation is obtained:

$$LBS\_D = \Sigma_{P=1}^{4} S(d_p - d_{global})2^{p-1}, d_p = |g_p - g_{mean}| \quad (2)$$

in which, $d_{global}$ represents a mean value of all the local gray differences in an entire image.

The complete description of the LBS is formed combined with the LBS_G and the LBS_D, and the equation of the LBS is as follows:

$$LBS = \Sigma_{P=1}^{4} S(g_p - g_{mean})2^{p+3} + \Sigma_{P=1}^{4} S(d_p - d_{global})2^{p-1} \quad (3)$$

In the meanwhile, the SES is also defined in this example:

$$SES = \Sigma_{P=1}^{4} S(d_p - t)2^{p-1} \quad (4)$$

in which, t represents a preset gray threshold; and in one specific embodiment, t is preset to be a relatively large threshold for discriminating a sharp edge.

In this example, the training of the texture dictionary can be accomplished by a k-means clustering mode to yield an incomplete dictionary, or the training of the texture dictionary can be accomplished by a sparse coding mode to yield an over-complete dictionary.

When the k-means clustering mode is adopted to train the dictionary, a certain amount (for example, one hundred thousand) samples are selected from the feature samples. A plurality of class centers are clustered using the k-means clustering algorithm, and a set of the class centers are used as the texture dictionary database. The use of the k-means clustering mode for training the dictionary is able to establish the incomplete dictionaries with low dimensions.

Preferably, when performing the super-resolution interpolation on the video image to be decoded, an unknown high resolution local image block can be represented by a combination of multiple dictionary bases in the texture dictionary database:

$$X \approx Dh(y)\alpha \quad (5)$$

in which, y represents a low resolution local image block corresponding to the high resolution local image block x, Dh(y) represents the high resolution dictionary sample of the dictionary basis that has the same LBS and SES as y, and α represents an expression coefficient.

When the coefficient α satisfies the sparsity in using the over-complete dictionary, the low resolution dictionary sample Dl(y) is used to calculate the sparse representation coefficient α, then the representation coefficient α is put into the equation (5) to calculate the corresponding high resolution local image block x. Thus, the acquisition of the optimized α can be transformed into the following optimization problem:

$$\min\|\alpha\|_0 s.t. \|FD_1\alpha - Fy\|_2^2 \leq \varepsilon \quad (6)$$

in which, ε is a minimum value approaching 0, F represents an operation of selecting a feature descriptor, and in the dictionary D provided in this example, the selected feature is a combination of a local gray difference and a gradient value. Because α is sparse enough, an L1 norm is adopted to substitute an L0 norm in the equation (6), then the optimization problem is converted to be the following:

$$\min_{\alpha}\|FD_1\alpha - Fy\|_2^2 + \lambda\|\alpha\|_1 \quad (7)$$

in which, λ represents a coefficient regulating the sparsity and the similarity. The optimized sparse representation coefficient α can be acquired by solving the above Lasso problem, then the optimized sparse representation coefficient α is put into the equation (5) to calculate the high resolution local image block x corresponding to y.

When α does not satisfy the sufficient sparsity in using the incomplete dictionary, the K-nearest neighbor algorithm is used to find k dictionary bases Dl(y) that are nearest to y, then linear combinations of k high resolution dictionaries Dh(y) corresponding to the Dl(y) are adopted to reconstruct x.

When all the clear high resolution image blocks x corresponding to each anamorphic low resolution local image blocks y in the image are reconstructed, the final clear image is restored.

EXAMPLE 2

FIG. 3 is a flow chart illustrating the operation of step 101 in Example 1. In this example, each dictionary basis in the texture dictionary database is classified according to local features of the relatively high resolution image blocks of each training image and local features of the relatively low resolution image blocks corresponding to the relatively high resolution image blocks. Each local feature comprises an LBS and an SES.

In the method for video encoding based on the image super-resolution of this example, the super-resolution interpolation on the video image using the pre-trained texture dictionary database specifically comprises:

101a. extracting a local feature of each image block of the video image;

101b. matching the local feature of each image block of the video image with the local features of each dictionary basis of the texture dictionary database to acquire a matched dictionary basis; and 101c. performing the recovery of the image details and the image magnification on the corresponding image block of the video image using the matched dictionary basis.

EXAMPLE 3

Figure 4:
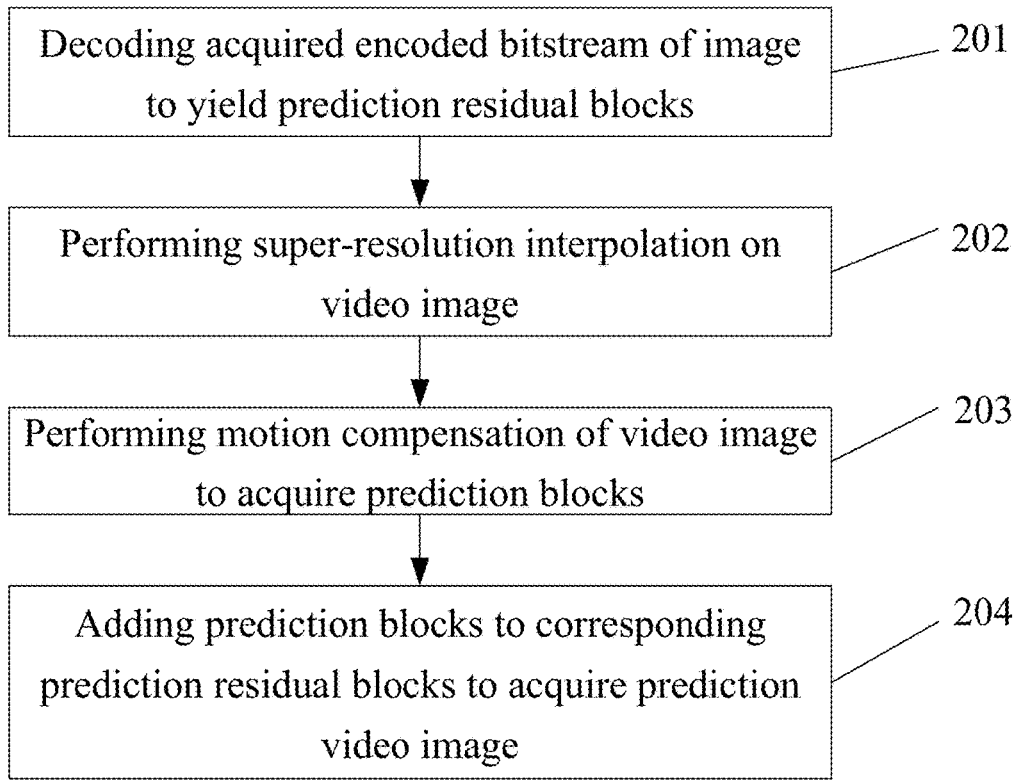
FIG. 4 is a flow chart of a method for video decoding based on an image super-resolution of Example 3.

FIG. 4 is a flow chart illustrating a method for video decoding based on an image super-resolution. As shown in FIG. 4, the method for video decoding based on the image super-resolution comprises:

201. decoding an acquired encoded bit stream of an image to yield prediction residual blocks;

202. performing super-resolution interpolation on a video image to be decoded using a pre-trained texture dictionary database to yield a reference image; in which, the texture dictionary database comprises one or multiple dictionary bases; each dictionary basis comprises a mapping group formed by a relatively high resolution image block of a training image and a relatively low resolution image block corresponding to the relatively high resolution image block; and the super-resolution interpolation comprises: image magnification and recovery of image details;

203. performing motion compensation of image blocks of the video image to be decoded on the reference image to acquire prediction blocks corresponding to the image blocks; and 204. adding the prediction blocks to the corresponding prediction residual blocks to acquire a video image after being decoded.

In the video decoding method based on the image super-resolution provided in this example, the acquired encoded bit stream of the image is decoded to yield the prediction residual blocks. The pre-trained texture dictionary database is utilized to perform the super-resolution interpolation on the video image to be decoded, in which the super-resolution interpolation comprises the image magnification and the recovery of the image detail. The video image after interpolation is then processed with motion compensation to yield the prediction blocks, and the prediction blocks and the corresponding prediction residual blocks are finally added to acquire the video image to be decoded. Compared with the method for predicting the video image by the linear interpolation in the prior art, the decoding method of the invention firstly processes the video image to be decoded with the super-resolution interpolation before the prediction, during which the image to be decoded can be magnified and the detail information thereof can be recovered. Thus, in the subsequent motion compensation of the image to be decoded for yielding the prediction blocks, the edge blur problem occurring in the prediction blocks in the prior art is avoided, thereby improving the prediction accuracy and the encoding efficiency.

EXAMPLE 4

Figure 5:
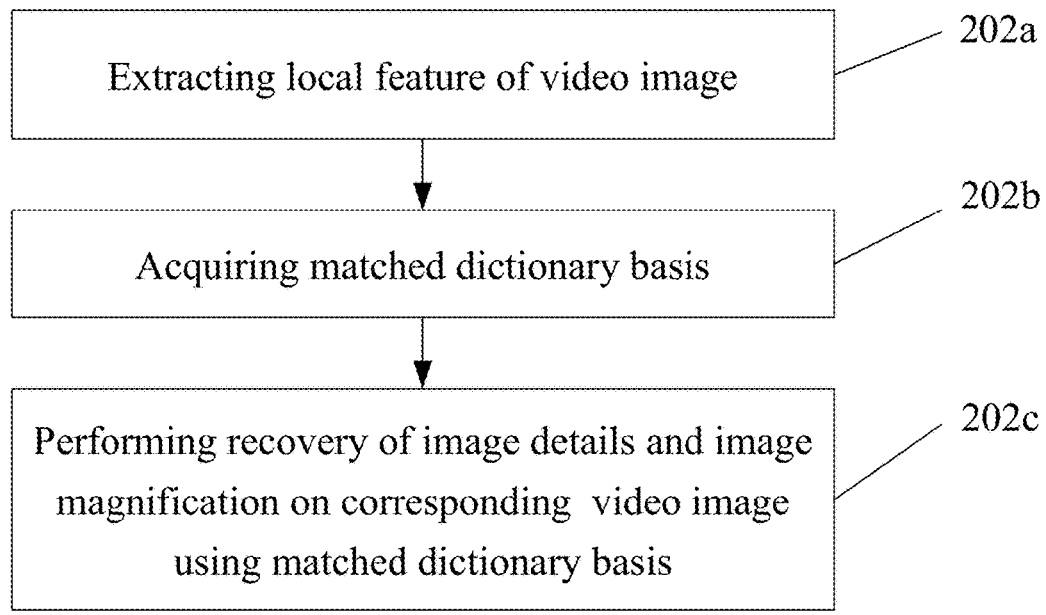
FIG. 5 is a flow chart of super-resolution interpolation on a video image to be decoded using a pre-trained texture dictionary database of Example 3.

As shown in FIG. 5, a flow chart of the mode for carrying out the step 202 in Example 3 is illustrated. In this example, each dictionary basis in the texture dictionary database is classified according to local features of the relatively high resolution image blocks of each training image and local features of the relatively low resolution image blocks corresponding to the relatively high resolution image blocks. Each local feature comprises an LBS and an SES.

The super-resolution interpolation on the video image to be decoded using the pre-trained texture dictionary database specifically comprises:

202a. extracting a local feature of each image block of the video image to be decoded;

202b. matching the local feature of each image block of the video image to be decoded with the local features of each dictionary basis of the texture dictionary database to acquire a matched dictionary basis; and 202c. performing the recovery of the image details and the image magnification on the corresponding image block of the video image to be decoded using the matched dictionary basis.

EXAMPLE 5

Figure 6:
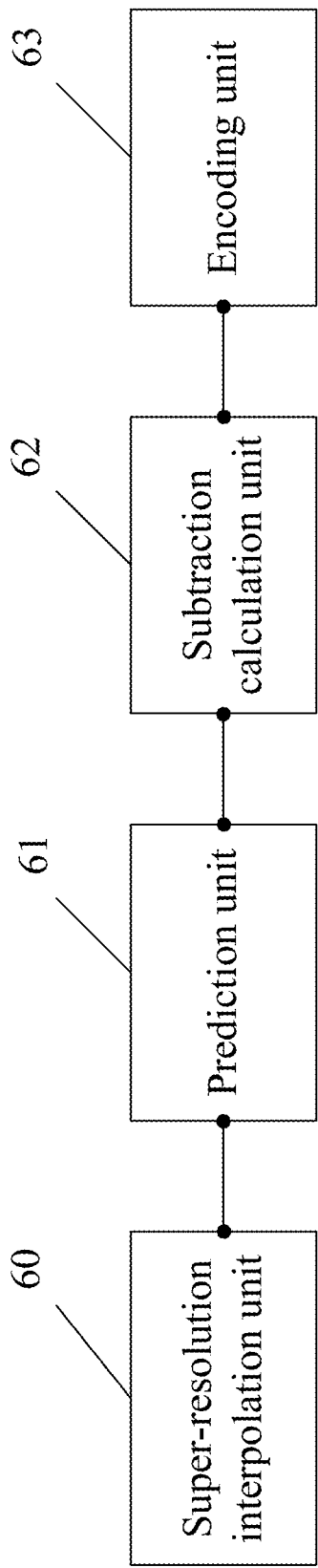
FIG. 6 is a structure diagram of a device for video encoding based on an image super-resolution of Example 5.

As shown in FIG. 6, a device for video encoding based on an image super-resolution is provided in this example, and the device comprises:

a super-resolution interpolation unit 60 configured to perform super-resolution interpolation on a video image to be encoded using a pre-trained texture dictionary database, in which the texture dictionary database comprise one or multiple dictionary bases; each dictionary basis comprises a mapping group formed by a relatively high resolution image block of a training image and a relatively low resolution image block corresponding to the relatively high resolution image block; and the super-resolution interpolation comprises: image magnification and recovery of image details;

a prediction unit 61 configured to perform motion estimation and motion compensation of image blocks of the video image on the reference image processed with super-resolution interpolation by the super-resolution interpolation unit 60 to acquire prediction blocks corresponding to the image blocks of the video image;

a subtraction calculation unit 62 configured to perform subtraction between the image blocks of the video image and the corresponding prediction blocks acquired by estimation of a motion estimation unit to yield prediction residual blocks, respectively; and an encoding unit 63 configured to encode the prediction residual blocks acquired by calculation of the subtraction calculation unit 62.

Preferably, as shown in FIG. 6, each dictionary basis in the texture dictionary database is classified according to local features of the relatively high resolution image blocks of each training image and local features of the relatively low resolution image blocks corresponding to the relatively high resolution image blocks. Each local feature comprises an LBS and an SES.

Figure 7:
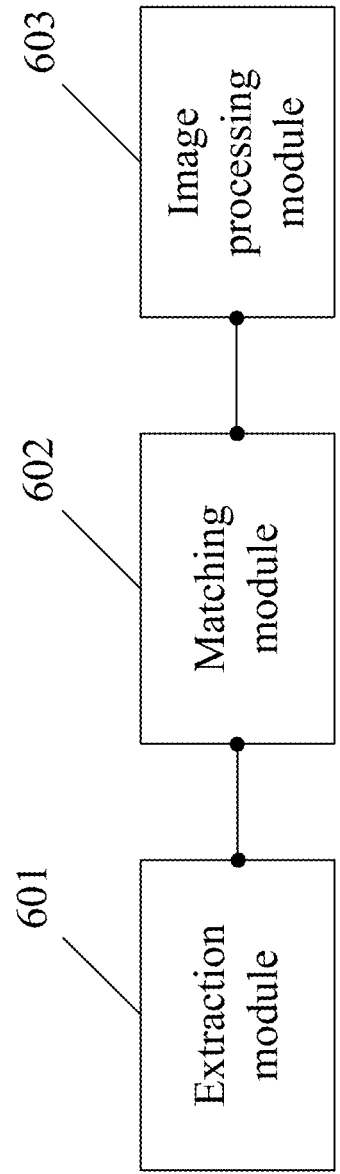
FIG. 7 is a structure diagram of a super-resolution interpolation unit of Example 5.

FIG. 7 is a structure diagram of the super-resolution interpolation unit in Example 5. As shown in FIG. 7, the super-resolution interpolation unit 60 specifically comprises:

an extraction module 601 configured to extract a local feature of each image block of the video image;

a matching module 602 configured to match the local feature of each image block of the video image extracted by the extraction module 601 with the local features of each dictionary basis of the texture dictionary database to acquire a matched dictionary basis; and an image processing module 603 configured to perform the recovery of the image details and the image magnification on the corresponding image block of the video image using the matched dictionary basis acquired by the matching module 602.

EXAMPLE 6

Figure 8:
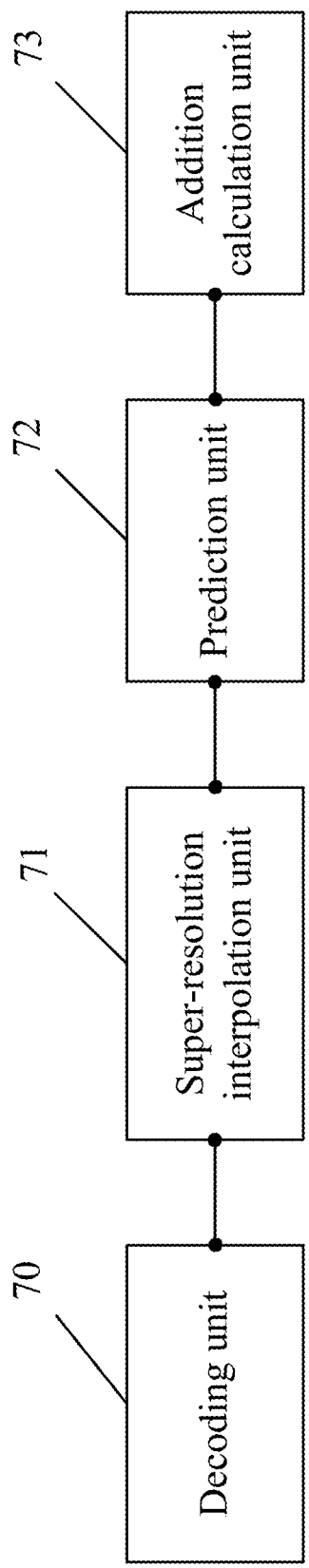
FIG. 8 is a structure diagram of a device for video decoding based on an image super-resolution of Example 6.

As shown in FIG. 8, a device for video decoding based on an image super-resolution is provided in this example, and the device specifically comprises:

a decoding unit 70 configured to decode an acquired encoded bit stream of an image to yield prediction residual blocks;

a super-resolution interpolation unit 71 configured to perform super-resolution interpolation on a video image to be decoded using a pre-trained texture dictionary database to yield a reference image, in which the texture dictionary database comprises one or multiple dictionary bases; each dictionary basis comprises a mapping group formed by a relatively high resolution image block of a training image and a relatively low resolution image block corresponding to the relatively high resolution image block; and the super-resolution interpolation comprises: image magnification and recovery of image details;

a prediction unit 72 configured to perform motion compensation of image blocks of the video image to be decoded on the reference image after processed with super-resolution interpolation by the super-resolution interpolation unit 71 to acquire prediction blocks corresponding to the image blocks of the video image to be decoded; and an addition calculation unit 73 configured to add the prediction blocks acquired by a motion compensation unit to the corresponding prediction residual blocks acquired by the decoding unit to acquire a video image after being decoded.

Figure 9:
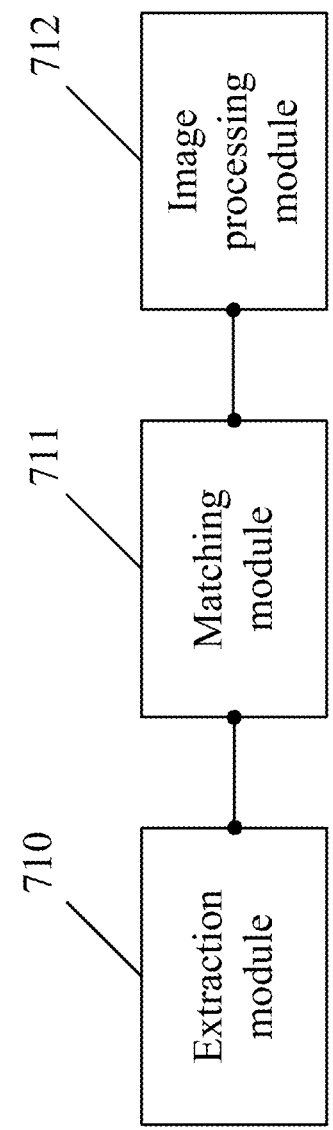
FIG. 9 is a structure diagram of a super-resolution interpolation unit of Example 6.

Preferably, as shown in FIG. 9 which illustrates a structure of the super-resolution interpolation unit, each dictionary basis in the texture dictionary database is classified according to local features of the relatively high resolution image blocks of each training image and local features of the relatively low resolution image blocks corresponding to the relatively high resolution image blocks. Each local feature comprises an LBS and an SES.

The super-resolution interpolation unit 71 comprises:

an extraction module 710 configured to extract a local feature of each image block of the video image to be decoded;

a matching module 711 configured to match the local feature of each image block of the video image to be decoded extracted by the extraction module 710 with the local features of each dictionary basis of the texture dictionary database to acquire a matched dictionary basis; and an image processing module 712 configured to perform the recovery of the image details and the image magnification on the corresponding image block of the video image to be decoded using the matched dictionary basis acquired by the matching module 711.

It can be understood by the skills in the technical field that all or partial steps in the methods of the above embodiments can be accomplished by controlling relative hardware by programs These programs can be stored in readable storage media of a computer, and the storage media include: read-only memories, random access memories, magnetic disks, and optical disks.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for video encoding based on an image super-resolution, the method comprising:
   1) performing super-resolution interpolation on a video image to be encoded using a pre-trained texture dictionary database to yield a reference image; wherein the texture dictionary database comprises one or multiple dictionary bases; each dictionary basis comprises a mapping group formed by a relatively high resolution image block of a training image and a relatively low resolution image block corresponding to the relatively high resolution image block; and the super-resolution interpolation comprises: image magnification and recovery of image details;
   2) performing motion estimation and motion compensation of image blocks of the video image on the reference image to acquire prediction blocks corresponding to the image blocks of the video image;
   3) performing subtraction between the image blocks of the video image and the corresponding prediction blocks to yield prediction residual blocks, respectively; and
   4) encoding the prediction residual blocks.

2. The method of claim 1, wherein each dictionary basis in the texture dictionary database is classified according to local features of the relatively high resolution image blocks of each training image and local features of the relatively low resolution image blocks corresponding to the relatively high resolution image blocks; and each local feature comprises a local binary structure and a sharp edge structure.

3. The method of claim 2, wherein the super-resolution interpolation of the video image using the pre-trained texture dictionary database comprises:
   a) extracting a local feature of each image block of the video image;
   b) matching the local feature of each image block of the video image with the local features of each dictionary basis of the texture dictionary database to acquire a matched dictionary basis; and
   c) performing the recovery of the image details and the image magnification on the corresponding image block of the video image using the matched dictionary basis.

4. A method for video decoding based on an image super-resolution, the method comprising:
   1) decoding an acquired encoded bit stream of an image to yield prediction residual blocks;
   2) performing super-resolution interpolation on a video image to be decoded using a pre-trained texture dictionary database to yield a reference image; wherein the texture dictionary database comprises one or multiple dictionary bases; each dictionary basis comprises a mapping group formed by a relatively high resolution image block of a training image and a relatively low resolution image block corresponding to the relatively high resolution image block; and the super-resolution interpolation comprises: image magnification and recovery of image details;

3) performing motion compensation of image blocks of the video image to be decoded on the reference image to acquire prediction blocks corresponding to the image blocks; and 4) adding the prediction blocks to the corresponding prediction residual blocks to acquire a video image after being decoded.

5. The method of claim 4, wherein each dictionary basis in the texture dictionary database is classified according to local features of the relatively high resolution image blocks of each training image and local features of the relatively low resolution image blocks corresponding to the relatively high resolution image blocks; and each local feature comprises a local binary structure and a sharp edge structure.

6. The method of claim 5, wherein the super-resolution interpolation on the video image to be decoded using the pre-trained texture dictionary database comprises:
   a) extracting a local feature of each image block of the video image to be decoded;
   b) matching the local feature of each image block of the video image to be decoded with the local features of each dictionary basis of the texture dictionary database to acquire a matched dictionary basis; and
   c) performing the recovery of the image details and the image magnification on the corresponding image block of the video image to be decoded using the matched dictionary basis.

7. A device for video encoding based on an image super-resolution, the device comprising:
   1) a super-resolution interpolation unit configured to perform super-resolution interpolation on a video image to be encoded using a pre-trained texture dictionary database to yield a reference image; wherein the texture dictionary database comprise one or multiple dictionary bases; each dictionary basis comprises a mapping group formed by a relatively high resolution image block of a training image and a relatively low resolution image block corresponding to the relatively high resolution image block; and the super-resolution interpolation comprises: image magnification and recovery of image details;
   2) a prediction unit configured to perform motion estimation and motion compensation of image blocks of the video image on the reference image to acquire prediction blocks corresponding to the image blocks of the video image;
   3) a subtraction calculation unit configured to perform subtraction between the image blocks of the video image and the corresponding prediction blocks acquired by estimation of a motion estimation unit to yield prediction residual blocks, respectively; and
   4) an encoding unit configured to encode the prediction residual blocks acquired by calculation of the subtraction calculation unit.

8. The device of claim 7, wherein
   each dictionary basis in the texture dictionary database is classified according to local features of the relatively high resolution image blocks of each training image and local features of the relatively low resolution image blocks corresponding to the relatively high resolution image blocks; each local feature comprises a local binary structure and a sharp edge structure; and
   the super-resolution interpolation unit comprises:
   a) an extraction module configured to extract a local feature of each image block of the video image;
   b) a matching module configured to match the local feature of each image block of the video image extracted by the extraction module with the local features of each dictionary basis of the texture dictionary database to acquire a matched dictionary basis; and
   c) an image processing module configured to perform the recovery of the image details and the image magnification on the corresponding image block of the video image using the matched dictionary basis acquired by the matching module.

9. A device for video decoding based on an image super-resolution, the device comprising:
   1) a decoding unit configured to decode an acquired encoded bit stream of an image to yield prediction residual blocks;
   2) a super-resolution interpolation unit configured to perform super-resolution interpolation on a video image to be decoded using a pre-trained texture dictionary database to yield a reference image; wherein the texture dictionary database comprises one or multiple dictionary bases; each dictionary basis comprises a mapping group formed by a relatively high resolution image block of a training image and a relatively low resolution image block corresponding to the relatively high resolution image block; and the super-resolution interpolation comprises: image magnification and recovery of image details;
   3) a prediction unit configured to perform motion compensation of image blocks of the video image to be decoded on the reference image to acquire prediction blocks corresponding to the image blocks of the video image to be decoded; and
   4) an addition calculation unit configured to add the prediction blocks acquired by a motion compensation unit to the corresponding prediction residual blocks acquired by the decoding unit to acquire a video image after being decoded.

10. The device of claim 9, wherein
   each dictionary basis in the texture dictionary database is classified according to local features of the relatively high resolution image blocks of each training image and local features of the relatively low resolution image blocks corresponding to the relatively high resolution image blocks; each local feature comprises a local binary structure and a sharp edge structure; and
   the super-resolution interpolation unit comprises:
   a) an extraction module configured to extract a local feature of each image block of the video image to be decoded;
   b) a matching module configured to match the local feature of each image block of the video image to be decoded extracted by the extraction module with the local features of each dictionary basis of the texture dictionary database to acquire a matched dictionary basis; and
   c) an image processing module configured to perform the recovery of the image details and the image magnification on the corresponding image block of the video image to be decoded using the matched dictionary basis acquired by the matching module.

* * * * *